(12) United States Patent
Severino (10) Patent No.: US 10,368,696 B2
(45) Date of Patent: Aug. 6, 2019

(54) CULINARY MIXER AND METHODS OF USE

(71) Applicant: Onofrio Severino, Hamilton, NJ (US)

(72) Inventor: Onofrio Severino, Hamilton, NJ (US)

(73) Assignee: Onofrio Severino, Hamilton, NJ (US)

( * ) Notice: Subject to any disclaimer, the term of this patent is extended or adjusted under 35 U.S.C. 154(b) by 164 days.

(21) Appl. No.: 15/292,815

(22) Filed: Oct. 13, 2016

(65) Prior Publication Data

US 2017/0105579 A1    Apr. 20, 2017

Related U.S. Application Data

(60) Provisional application No. 62/241,352, filed on Oct. 14, 2015.

(51) Int. Cl.
| | | |
|---|---|---|
| *A47J 43/00* | (2006.01) | |
| *A47J 43/10* | (2006.01) | |
| *B01F 13/00* | (2006.01) | |
| *B01F 15/00* | (2006.01) | |

(52) U.S. Cl.
CPC ......... *A47J 43/1075* (2013.01); *B01F 13/005* (2013.01); *B01F 13/0022* (2013.01); *B01F 15/00512* (2013.01); *B01F 15/00889* (2013.01); *B01F 2215/0014* (2013.01)

(58) Field of Classification Search
CPC . A47J 43/1075; B01F 13/0022; B01F 13/005; B01F 15/00512; B01F 15/00889; B01F 2215/0014
See application file for complete search history.

(56) References Cited

U.S. PATENT DOCUMENTS

| | | | |
|---|---|---|---|
| 2,793,012 A * | 5/1957 | Wolf | A45D 34/048 |
| | | | 215/228 |
| D510,235 S | 10/2005 | Sorensen | |
| 7,299,936 B2 | 11/2007 | Singh et al. | |
| 7,371,004 B1 | 5/2008 | Branson, III et al. | |
| 7,717,611 B2 | 5/2010 | Wu | |
| D723,325 S | 3/2015 | Enghard | |
| 2005/0105387 A1 | 5/2005 | Nikkhah | |
| 2005/0224504 A1 * | 10/2005 | Killoren | B65D 81/3886 |
| | | | 220/737 |
| 2006/0255035 A1 | 11/2006 | Lin | |
| 2008/0094938 A1 | 4/2008 | Waggoner et al. | |
| 2009/0050494 A1 | 2/2009 | Munz | |
| 2011/0283897 A1 | 11/2011 | Fang et al. | |
| 2013/0279287 A1 * | 10/2013 | Cerasani | B65D 47/0885 |
| | | | 366/130 |

OTHER PUBLICATIONS

"600ml plastic protein shaker cyclone cup blender mixer bottle with filter and containers" (retrieved on Sep. 2, 2015) from: http://amy0320.buy.weamax.com/iz6a36592-600ml-plastic-protein-shaker-cyclone-cup-blender-mixer-bottle-with-filter-and-containers-images.html, 2 pages.

(Continued)

*Primary Examiner* — Anshu Bhatia
(74) *Attorney, Agent, or Firm* — Servilla Whitney LLC (57) ABSTRACT

Apparatus for mixing culinary ingredients including a container with a lid and mixer with fingers are disclosed. Methods of mixing culinary ingredients using apparatus are also disclosed.

20 Claims, 7 Drawing Sheets

(56) References Cited

OTHER PUBLICATIONS

"700ml Shaker To Go—To Go—Sistema Plastics" (retrieved on Sep. 2, 2015) retrieved from: http://sistemaplastics.com/products/to-go/700ml-shaker-to-go, 2 pages.

"Mastrad® Qwik Wisk Universal Mixer" (retrieved on Sep. 2, 2015) retrieved from: https://m.bedbathandbeyond.com/m/product/mastrad-reg-qwik-wisk-universal-mixer/1042049630? categoryId=12047&AID=10817676&PID=2178999&SID=1518394950&source=Commission+Junction&utm_source=ShopStyle.com&utm_medium=affiliate&utm_campaign=Bed+Bath+and+Beyond+Product+Catalog&mcid=AF_CJ___1909792, 3 pages.

"OXGIFT egg whisk egg shaker egg style product" (retrieved on Sep. 2, 2016) retrieved from: http://m.alibaba.com/product/60082280598/OXGIFT-egg-whisk-egg-shaker-egg.html, 1 page.

"Rotary egg beater with container, Rotary handle whisk, Rotary handle egg breaker" (retrieved on Sep. 2, 2015) retrieved from: http://m.alibaba.com/product/1977634987/Rotary-egg-beater-with-container-Rotary.html, 1 page.

\* cited by examiner

CULINARY MIXER AND METHODS OF USE

CROSS-REFERENCE TO RELATED APPLICATIONS

This application claims priority to U.S. Provisional Application No. 62/241,352, filed Oct. 14, 2015, the entire disclosure of which is hereby incorporated by reference herein.

TECHNICAL FIELD

Embodiments of the present disclosure generally relate to culinary appliances and their methods of use. More particularly, embodiments of the disclosure relate to mixing apparatus and methods of preparing food using same.

BACKGROUND

Mixing of ingredients in a culinary environment can be accomplished by many methods. In the making of an omelet, for example, an egg might be cracked into a bowl and beaten using a whisk or fork. Beating the egg causes the egg yolk sac to break and mix with the albumin. Additional ingredients can be added to the bowl (e.g., mushrooms, spinach) in addition to the egg. The ingredients can be stirred into the mixture either before or after breaking the yolk sac.

Mixing an egg in this manner can result in the mixture splashing out of the bowl. Additionally, it can become tiresome to whisk large quantities eggs. Mixing using a whisk or fork requires rapid circular movement of the wrist to properly mix and aerate the mixture. For some people, this rapid circular motion of the wrist is not possible. Moreover, mixing using a bowl and whisk requires two hands; one hand holding the bowl and other hand holding and working the whisk. Therefore, there is a need in the art for apparatus and methods evenly mix ingredients quickly and easily.

SUMMARY

One or more embodiments of the disclosure are directed to culinary mixers comprising a container with a lid and mixer. The container has a closed bottom, inner side, an outside surface and an open top, the open top and closed bottom defining a container height. The lid has a top surface, sides and a bottom surface. The lid is configured to be connected to the open top of the container to form a fluid-tight seal and enclose a volume defined by the bottom surface of the lid, the inner sides and closed bottom of the container. The mixer has a base configured to be positioned adjacent the bottom surface of the lid and sized to fit within the volume. The mixer comprises at least one mixing finger. When the mixer is positioned within the container, at least one finger extend from the base of the mixer to a distance greater than or equal to about 50% of the container height.

Additional embodiments of the disclosure are directed to culinary mixers comprising container, a lid and a mixer. The container has a closed bottom, inner side, an outside surface and an open top. The open top and closed bottom define a container height. The lid has a top surface, sides and a bottom surface, the lid configured to be connected to the open top of the container to form a fluid-tight seal and enclose a volume defined by the bottom surface of the lid, the inner sides and closed bottom of the container. The mixer has a base configured to be positioned adjacent the bottom surface of the lid and sized to fit within the volume. The mixer comprises a plurality of mixing fingers having a first end and a second end. The first end is connected to the base and at least some of the fingers having a second end not connected to the base. The plurality of mixing fingers is configured so that no finger contacts another finger forming an intersection.

Further embodiments of the disclosure are directed to methods of mixing. Ingredients to be mixed are placed within a container having a closed bottom, sides and an open top, the open top and closed bottom defining a container height. A mixer is positioned within the container. The mixer comprises a base with a plurality of mixing fingers extending therefrom. The mixing fingers extend greater than or equal to about 50% of the height of the container. A lid is connected to the open top of the container to form sealed container. The sealed container is shaken a number of times to mix the ingredients.

BRIEF DESCRIPTION OF THE DRAWINGS

So that the manner in which the features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Figure 1:
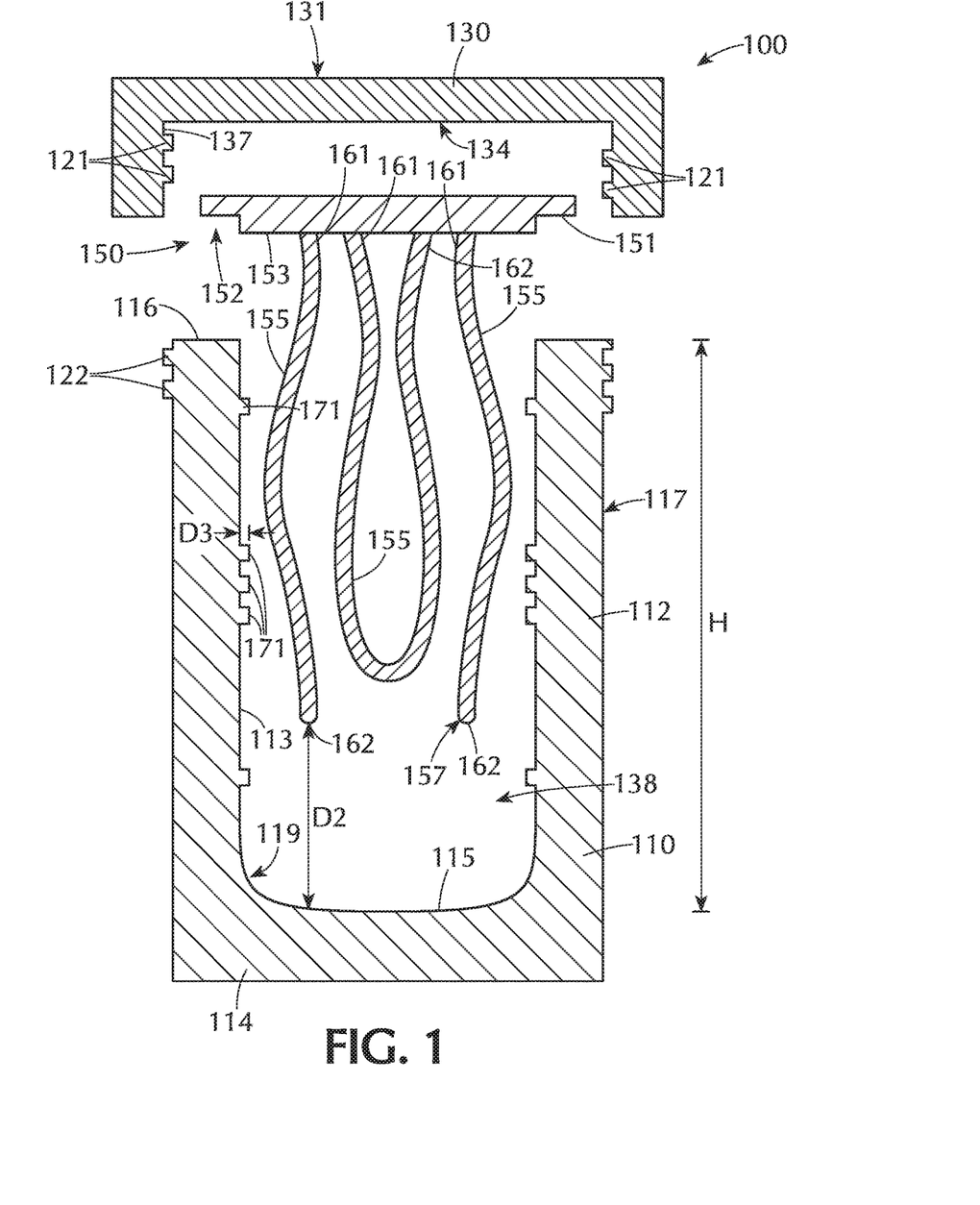
FIG. 1 shows a culinary mixer in accordance with one or more embodiment of the disclosure.

FIG. 1 shows a cross-section of a culinary mixer 100 in accordance with one or more embodiment of the disclosure. A container 110 that is capable of, adapted to and/or configured to retain a fluid is provided. The container 110 has sides 112, a closed bottom 114 and an open top 116. The height H of the container 110 is defined as the distance from the open top 116 to the inside surface 115 of the closed bottom 114. The thickness of the closed bottom 114 is not considered part of the height H of the container 110. While the container 110 shown in FIG. 1 has a tube-like shape with a plugged end, the container 110 can be any suitable shape.

The inner side 113 of the side 112 can be parallel to, or not parallel to the outside surface 117. For example, as shown in FIG. 1, the outside surface 117 can be substantially perpendicular to the bottom surface 118 of the closed bottom 114 while the inner side 113 slopes inwardly from the open top 116 of the container to the inside surface 115 of the closed bottom 114.

The transition 119 from the inner side 113 to the inside surface 115 of the closed bottom 114 can form a discreet angle. For example, if the side 112 and closed bottom 114 were separate parts connected together, an inside corner might be formed at the junction. In the embodiment shown in FIG. 1, the transition 119 is curved so that there is a gradual change from the substantially vertical inner side 113 to the inside surface 115 of the closed bottom 114. Some embodiments have a smooth transition 119 without an interior corner.

The container 110 can be integrally formed so that the sides 112 and closed bottom 114 are made from a single piece of material, or can be a combination of two or more components joined to form the container 110. In some embodiments, the transition 119 is smooth to provide a surface that is less likely to retain unwanted food residue than a transition 119 forming an inside corner.

The thickness of the sides 112 of the container 110 is defined as the distance between the inner side 113 and the outside surface 117 at any given distance from the open top 116. The thickness of the container 110 shown be substantially uniform along the distance from the open top 116 to the transition 119 or can vary along the distance. The embodiment shown in FIG. 1 has a thickness that increases as a function of the distance from the open top 116. In some embodiments, the inner side 113 of the container 110 is substantially straight from the open top 116 to the transition 119.

The sides 112 of the container 110 can be a solid component or can be hollow. A hollow side 112 could have a region of lower than atmospheric pressure (e.g., a partial vacuum) to provide thermal insulation to the container 110. In some embodiments, the sides 112 are hollow and contain a fluid having one or more of a specific heat capacity greater than that of water (e.g., ethylene glycol) and/or a freezing point lower than that of water (e.g., saline). Embodiments of this sort can be placed in a refrigerator or freezer prior to use. Upon removing the container 110 from the refrigerator or freezer, the fluid can retain the cold temperature so that food items placed within the container are kept cold longer.

In some embodiments, the container 110 is transparent to allow a user to see the inside during use. In one or more embodiments, the outside surface 117 includes measurement lines.

The culinary mixer 100 also includes a lid 130 having a top surface 131, sides 132 and a bottom surface 134. The lid 130 is configured to be connected to the open top 116 of the container 110. As used in this manner "connected" can be a temporary state so that the lid 130 can be removed from the container 110. As used in this manner, "configured to be connected" means that the lid 130 is sized to fit over the open top 116 and/or has one or more components to maintain a connection between the open top 116 and the lid 130. The lid 130 can be connected by any of a screw-type motion, a snap-on connection, an interference fit or combinations thereof. In some embodiments, the connected culinary mixer 100 is impact resistant so that if dropped from a typical operating height, the lid 130 will not come off of the container 110.

When the lid 130 is connected to the container 110, a fluid-tight seal is formed to prevent or minimize leakage of a fluid from the enclosed volume 138 defined by the bottom surface 134 of the lid 130, the inner sides 113 of the sides 112 and the inside surface 115 of the closed bottom 114. The volume of the culinary mixer 100 of various embodiments is sufficient to hold up to and including about 4 eggs, 5 eggs, 6 eggs, 7 eggs, or 8 eggs (without shells).

The culinary mixer 100 further comprises a mixer 150 which can be a separate component, as shown in FIG. 1. Referring to FIG. 1, the mixer 150 includes a base 151 configured to be positioned adjacent the bottom surface 134 of the lid 130 and to fit within the volume 138. When the mixer 150 is a separate component from the lid 130, the volume 138 is decreased by the thickness of the base 151.

The base 151 of the mixer 150 can be sized to rest on the open top 116 of the container 110. If the base 151 is too small, the mixer 150 could fall into the volume 138. The base 151 resting on the open top 116 may help to form the fluid-tight seal. The base 151 of some embodiments includes a lip 152 around at least a portion of the outer peripheral edge of the base 151. The lip 152 can be used to help position the mixer 150 on the open top 116.

Figure 2:
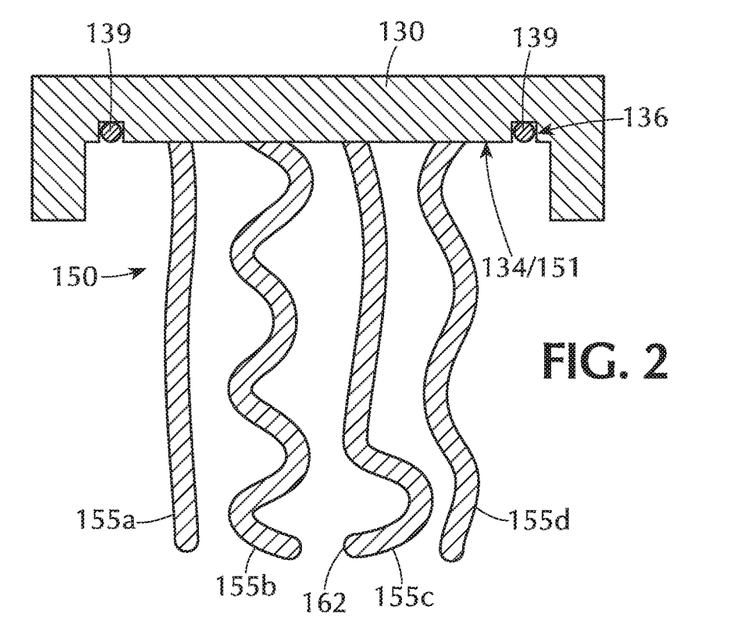
FIG. 2 shows a lid and mixer with different fingers in accordance with one or more embodiment of the disclosure.

In some embodiments, the mixer 150 and the lid 130 are integrally formed as a single component, as shown in FIG. 2. Referring to FIG. 2, the mixer 150 is connected to the bottom surface 134 of the lid 130 so that the bottom surface 134 also serves as the base 151 of the mixer 150. In embodiments of the type shown in FIG. 2, the lid 130 and mixer 150 can be separate components connected together or integrally formed as a single component.

The mixer 150 includes a plurality of mixing fingers 155 that extend to a distance D from the base 151 of the mixer 150. The distance D is measured from the bottom 153 of the base 151 to the furthest point 157 of the fingers 155 from the base 151.

Each finger 155 has a first end 161 and a second end 162 where at least the first end 161 is connected to the base 151. The second end 162 of each finger 155 can connect to the base 151 or can be unconnected. In some embodiments, each finger 155 has a first end 161 connected to the base 151 and at least some of the fingers 155 have a second end 162 not connected to the base. In some embodiments, the first ends 161 and at least some of the second ends 162 are connected to the base 151 so that the finger 155 forms a loop. The embodiment of FIG. 1 shows three fingers 155 of different shapes. The left finger 155 and the right finger 155 each connect to the base 151 at the first end 161 and have an unconnected second end 162. The center finger 155 has both the first end 161 and the second end 162 connected to the base 151. In one or more embodiments, all of the fingers 155 are connected to the base 151 at the first end 161 and not connected at the second end 162.

In some embodiments, at least some of the fingers 155 extend from the base 151 of the mixer 150 to a distance greater than or equal to about 50% of the height H of the container 110. In various embodiments, at least some of the fingers 155 extend to a distance D greater than or equal to about 55%, 60%, 65%, 70%, 75%, 80%, 85% or 90% of the height H of the container 110.

In some embodiments, when the mixer 150 is positioned within the container (i.e., so that the fingers 155 are in the volume 138), the fingers 155 are configured to extend a distance from the base 151 so that the distance $D_2$ between the closed bottom 114 and at least some of the fingers 155 is less than or equal to about 3 cm. In various embodiments, the distance $D_2$ is less than or equal to about 2.5 cm, 2 cm, 1.5 cm, 1 cm or 0.5 cm.

The fingers 155 of some embodiments to not contact the inner side 113 of the container 110. In various embodiments, the fingers 155 are less than about 15 mm, 10 mm or 5 mm from the inner side 113 without contacting the inner side 113.

The number of fingers 155 can vary depending on, for example, the size of the base 151, the thickness of the fingers 155 and/or the shape of the fingers 155. In some embodiments, there is at least one finger 155. In various embodiments, there are greater than or equal to 2, 3, 4, 5, 6, 7, 8, 9, 10, 11, 12, 13, 14, 15, 16, 17, 18, 19, 20, 21, 22, 23, 24 or 25 fingers 155. In one or more embodiments, there are in the range of about 6 to about 30 fingers, or in the range of about 7 to about 25 fingers, or in the range of about 8 to about 20 fingers. In some embodiments, all of the fingers 155 are connected to the base 151 at the first end 161 and second end 162 and there are at least about five fingers. In some embodiments, all of the fingers 155 connect to the base 151 at only the first end 161 and there are at least about ten fingers.

Referring to FIG. 2, the shape of the fingers 155 can vary. The left-most finger 155a extends substantially straight from the base 151. The second finger 155b extends from the base 151 in a corkscrew pattern. The third finger 155c is straight near the base 151 and has a corkscrew near the second end 162. The fourth finger 155d has a wiggle shape. It will be understood that the shapes shown in FIG. 2 are merely representative of the finger 155 shape and should not be taken as limiting the scope of the disclosure. In some embodiments, each of the fingers 155 has substantially the same shape so that, for example, each of the fingers 155 is substantially straight, or each has a corkscrew shape. In one or more embodiments, each of the fingers 155 has a shape independent of any other finger 155 so that each finger is different. In various embodiments, at least two of the fingers 155 have the same shape and at least two have different shapes. In some embodiments, each of the fingers 155 is connected at both the first end 161 and second end 162 to form a loop shape where the loops do not contact adjacent loops.

Figure 4:
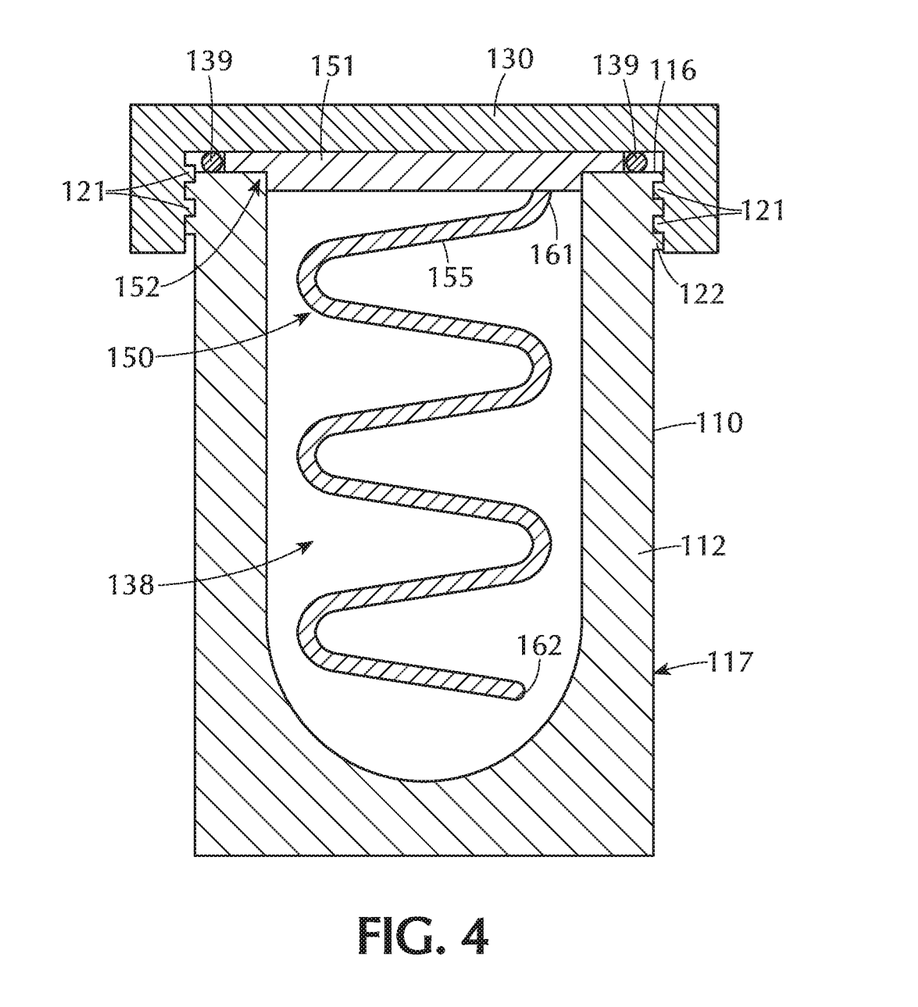
FIG. 4 shows another embodiment of a culinary mixer in accordance with one or more embodiment of the disclosure.

In the embodiment shown in FIG. 4, the mixer 150 has one finger 155. The finger 155 connects to the base 151 at the first end 161 and extends from the base 151 in a helical shape to the second end 162 which is not connected to the base 151. In this embodiment, there is one finger 155 but it will be understood that additional fingers 155 could extend from the base, for example, through the center of the helix.

Figure 3:
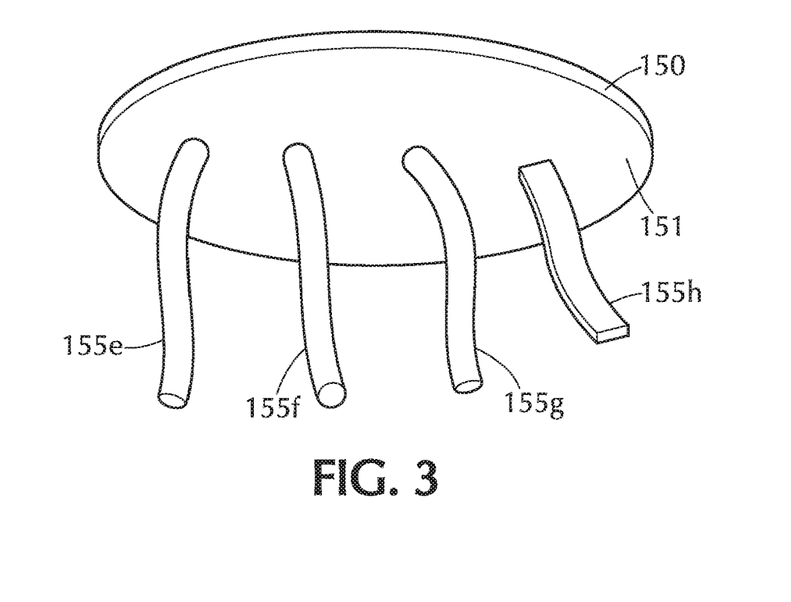
FIG. 3 shows a mixer with different fingers in accordance with one or more embodiment of the disclosure.

Referring to FIG. 3, the cross-sectional shape of the fingers 155 can also vary. Again, it will be understood that the shapes in FIG. 3 are merely representative and should not be taken as limiting the scope of the disclosure. As shown in FIG. 3, finger 155e has an oval cross-section, finger 155f has a round cross-section, finger 155g has an almond-shaped cross-section and finger 155h has a rectangular or ribbon shaped cross-section. In some embodiments, each of the fingers 155 has substantially the same cross-sectional shape so that, for example, each of the fingers 155 has a round cross-section. In one or more embodiments, each of the fingers 155 has a cross-sectional shape independent of any other finger 155 so that the cross-sectional shape is different for each finger. In various embodiments, at least two of the fingers 155 have the same cross-sectional shape and at least two have different cross-sectional shapes.

In some embodiments, the plurality of fingers 155 is configured so that no finger 155 contacts another finger 155 to form an intersection. In some embodiments, the plurality of fingers 155 is configured to prevent food from becoming caught in the fingers 155. For example, if the fingers 155 were arranged to form a basket shape, larger food pieces could become caught inside the arrangement of fingers 155. In some embodiments, the plurality of fingers 155 is configured so that there are less than or equal to about 5, 4, 3 or 2 connections between different fingers 155. A "connection" used in this manner refers to a point where two or more different fingers touch.

The base 151 and fingers 155 of the mixer 150 can be made of the same material or different materials. Suitable materials include, but are not limited to, metal, plastic, rubber, rubber-coated metal, silicone or silicone-coated metal. Each finger 155 can be made of a different material or all of the fingers can be made from the same material.

Some embodiments include a component on the inside of the container that helps with mixing. Referring again to FIG. 1, the inner side 113 of the container 110 comprises a plurality of ridges 171 spaced along the height H of the container 110. The ridges 171 extend into the volume 138 to a distance $D_3$ in the range of about 1 mm to about 5 mm. The ridges 171 can be any shape including, but not limited to, rectangular, triangular and rounded. The ridges 171 shown in FIG. 1 are rectangular in shape.

Figure 5:
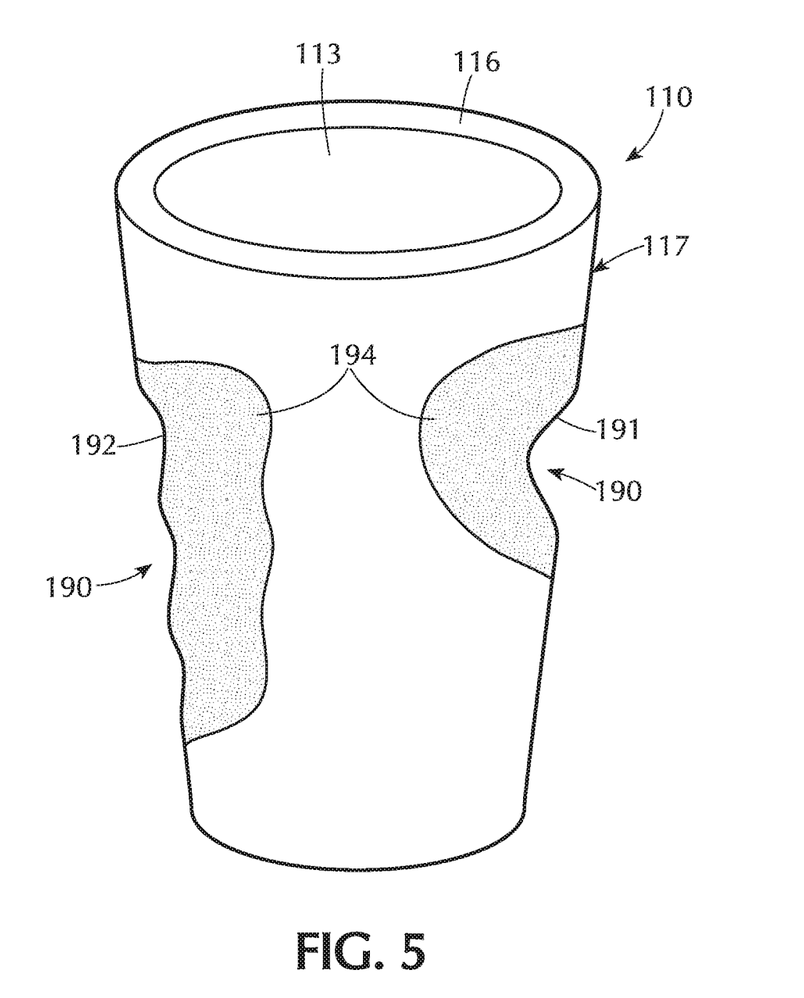
FIG. 5 shows a container with contoured grip in accordance with one or more embodiment of the disclosure.

The outside surface 117 of the container 110 can be any suitable shape or size. Referring to FIG. 5, some embodiments have an outside surface 117 which includes a gripping region 190 that is sized and shaped to fit a human hand to allow for a more secure grip on the culinary mixer. For example, a human thumb can rest in the indentation 191 on the right side of the Figure and the fingers can rest in the indentation 192 on the left side of the Figure. In some embodiments, as shown in FIG. 5, the gripping region 190 comprises a gripping surface 194. As used in this regard, a "gripping surface" is a surface texture or material that provides additional friction between the hand and the container.

To secure the lid 130 to the open top 116 of the container 110, various embodiments include one or more protrusions and/or recesses. Referring to FIGS. 1 and 4, the inside 137 of the lid 130 may include screw threads 121. The screw threads 121 can be configured to cooperatively interact with complementary screw threads 122 on the outside surface 117 of the container 110.

Figure 6A:
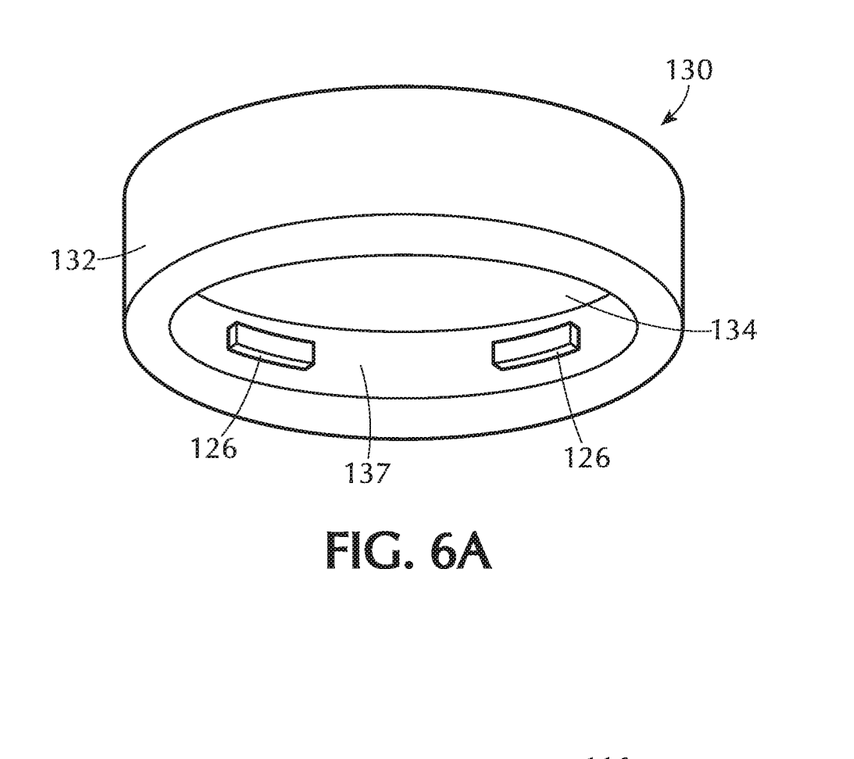
FIG. 6A shows a lid in accordance with one or more embodiment of the disclosure.
Figure 6B:
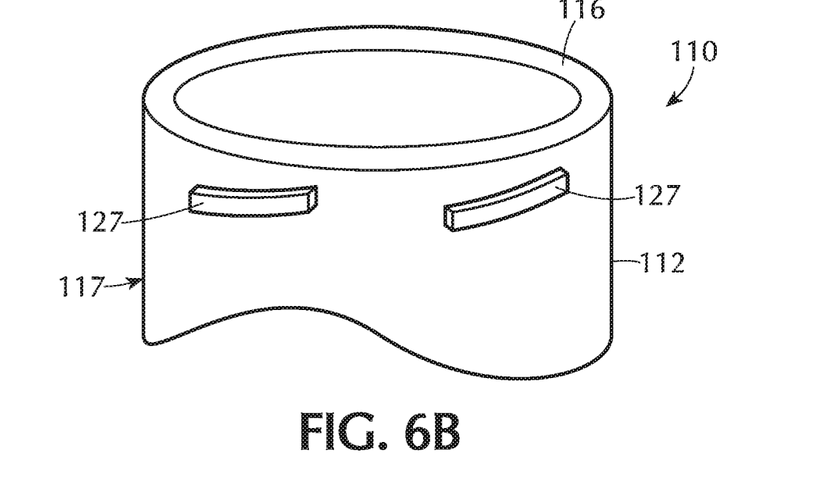
FIG. 6B shows a container to interact with the lid of FIG. 6A.

Referring to FIGS. 6A and 6B, another embodiment of a closure for the culinary mixer 100 is shown. FIG. 6A shows the lid 130 with a plurality of tapered tabs 126 on the inside 137 of the lid 130. The tapered tabs 126 extend from the inside 137 of the lid 130 by an amount that allows the tabs 126 to cooperatively interact with complementary projections 127 on outside surface 117 of the container 110, as shown in FIG. 6B.

Figure 6C:
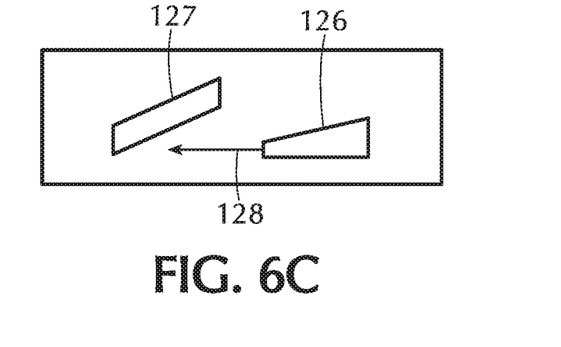
FIGS. 6C and 6D show tapered tabs and complementary projections to connect the lid of FIG. 6A with the container of FIG. 6B.
Figure 6D:
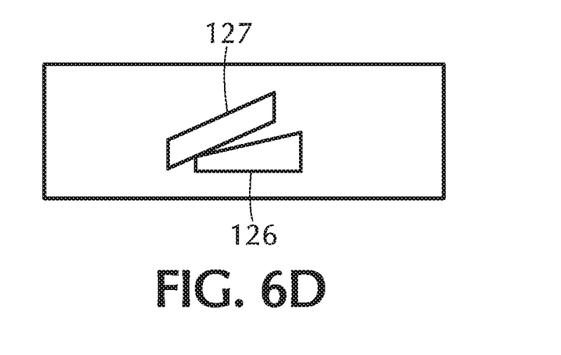

In use, when the lid 130 is positioned adjacent the open top 116 of the container 110, the tapered tabs 126 and complementary projections 127 are not touching, as shown in FIG. 6C. Upon initial contact between the lid 130 and the open top 116, the tapered tabs 126 and complementary projections 127 may be touching. In this case, the lid 130 can be rotated counterclockwise so that the tapered tab 126 and complementary projection 127 are adjacent each other, like FIG. 6C. Rotation of the lid 130 in the clockwise direction 128 causes the tapered tabs 126 to contact the complementary projections 127. Further clockwise rotation will become more difficult as the friction between the tapered tabs 126 and the complementary projections 127 increase because the shapes of these components will force the lid 130 downward, tightening the connection and forming a fluid tight seal.

Figure 7:
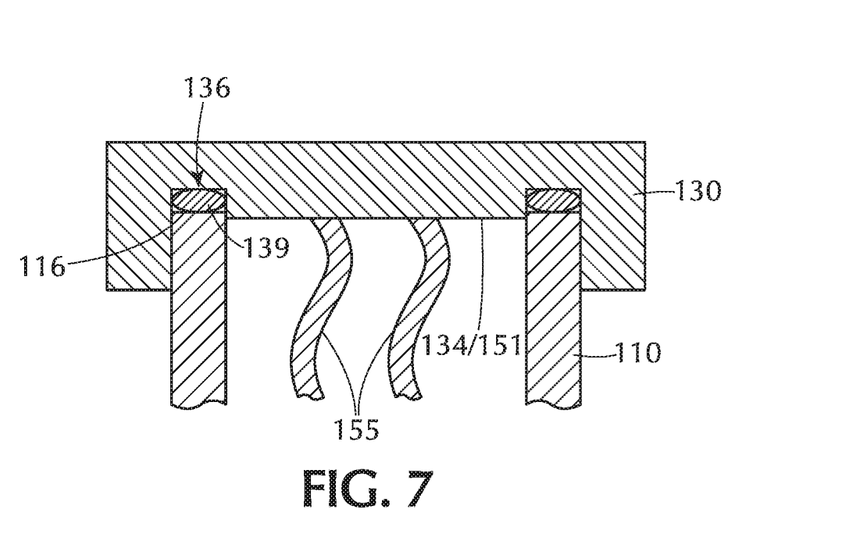
FIG. 7 shows a culinary mixer in accordance with one or more embodiment of the disclosure.

Referring to FIG. 7, some embodiments of the lid 130 include a recessed region 136 in the bottom surface 134. The recessed region 136 can be sized to allow the open top 116 of the container 110 to fit within. The recessed region 136 in some embodiments further comprises an o-ring 139. Upon tightening the lid 130 onto the open top 116 of the container 110, the o-ring 139 may be compressed to increase the fluid-tight seal. O-rings suitable for use are made from any food safe material that can be compressed to form the fluid-tight seal.

Figure 8:
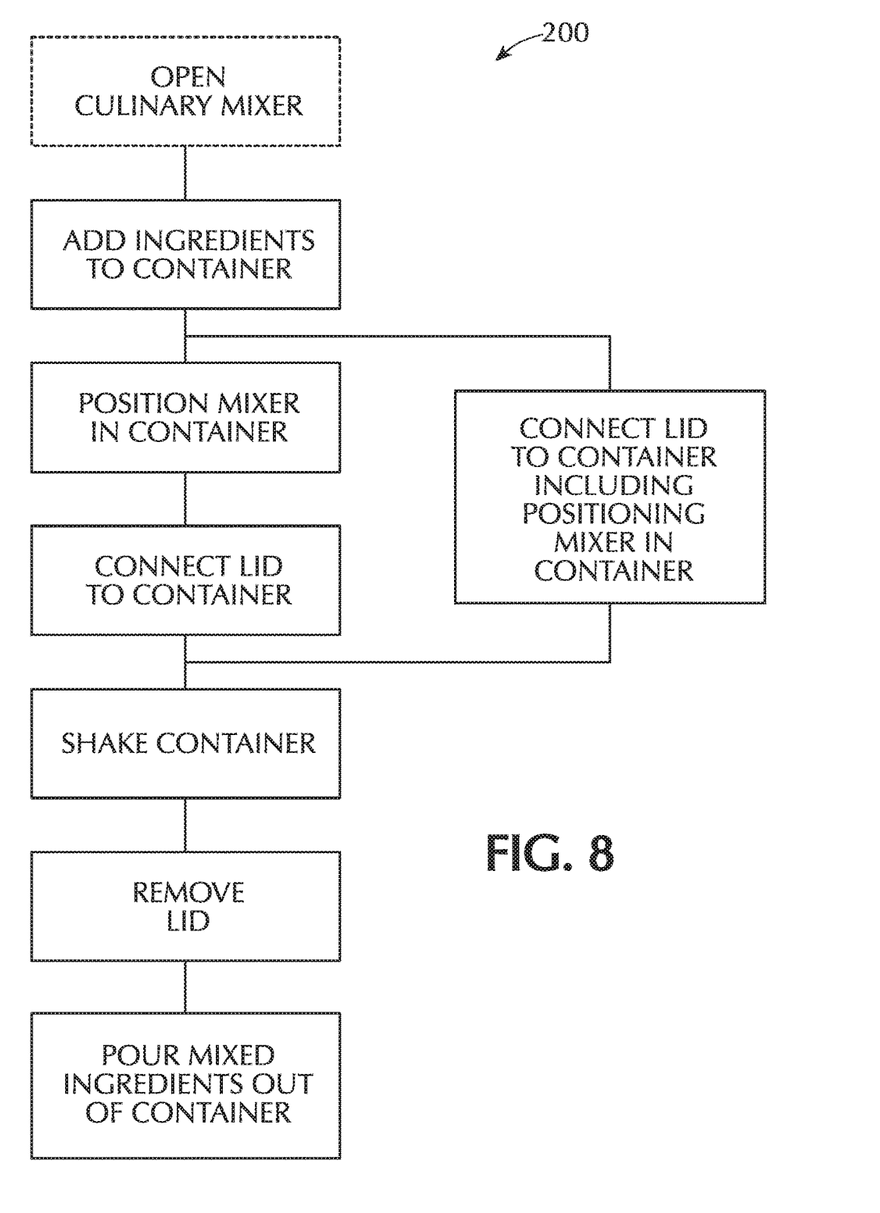
FIG. 8 shows a flowchart of a method of mixing ingredients in accordance with one or more embodiment of the disclosure.

Additional embodiments of the disclosure are directed to methods of mixing. The methods are described with respect to the making of an omelet. This is merely one exemplary embodiment and should not be taken as limiting the scope of the disclosure. Those skilled in the art will understand that the method can be practiced with different ingredients. FIG. 8 shows a flowchart of the method described. The order of steps in the flowchart can be rearranged as will be understood by those skilled in the art and should not be taken as limiting the scope of the method.

If the culinary mixer 100 is closed, the method 200 comprises opening the culinary mixer 100. Once the open top 116 of the container 110 is accessible, the ingredients are placed within the container 110. In this example, the ingredients include at least one egg. It will be understood that the egg is cracked open and the contents—yolk sac and albumin—are added to the container 110. The shell of the egg is generally not included in the ingredients. In some embodiments, the ingredients include at least one egg and one or more vegetables, fruits or proteins (other than eggs). For example, when making a spinach omelet, the ingredients comprise at least one egg and spinach.

After adding the ingredients to the container 110, a mixer 150 is positioned within the container 110. The mixer 150 includes a base 151 and at least one finger 155 that extends into the volume 138 of the container 110. A lid 130 is connected to the open top 116 of the container 110 to form a fluid tight seal. If the mixer 150 and lid 130 are a single component, then both of these steps are performed at substantially the same time.

Connecting the lid 130 to the container 110 in some embodiments includes rotating the lid 130 in a clockwise and/or counterclockwise direction. Additionally, connecting the lid 130 may further comprise compressing an o-ring between the lid 130 and the open top 116 of the container 110 to contribute to the fluid tight seal.

Once the fluid-tight seal has been established, the sealed container 110 is shaken a number of times to mix the ingredients. Shaking can occur in an up-and-down motion so that the entire container including lid move up and down together. Shaking can occur in a side-to-side motion so that the entire container including lid move from left to right together. In some embodiments, shaking occurs in a twisting motion so that the lid and the closed bottom of the container move in opposite directions in a reciprocating manner.

In some embodiments, the container is shaken less than about 10 times to sufficiently mix the ingredients. A complete shake includes both the up and down motion, or the left and right motion, or a clockwise and counterclockwise twist so that the container is returned to the approximate orientation/position prior to the shake cycle. In various embodiments, the container is shaken less than about 8 times, 6 times, 5 times, 4 times or 3 times to sufficiently mix the ingredients.

Once the ingredients are sufficiently mixed, the lid 130 is removed from the container 110 and the mixed ingredients are poured out of the container 110.

In some embodiments, the egg is mixed in the container first. The lid can then be removed and additional ingredients added. If the additional ingredients are to be shaken into the egg, then the lid can be reattached and the combined ingredients shaken.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in various embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A culinary mixer comprising:
    a container having a closed bottom, inner side, an outside surface and an open top, the open top and closed bottom defining a container height;
    a lid having a top surface, sides and a bottom surface, the lid configured to be connected to the open top of the container to form a fluid-tight seal and enclose a volume defined by the bottom surface of the lid, the inner sides and closed bottom of the container; and
    a mixer having a base configured to be positioned adjacent the bottom surface of the lid and sized to fit within the volume, the mixer comprising at least one mixing finger,
    wherein when the mixer is positioned within the container, at least one finger extends from the base of the mixer to a distance greater than or equal to about 50% of the container height,
    wherein there are a plurality of fingers and each of the fingers has a first end and a second end, the first end of each of the fingers connected to the base and at least some of the second ends are connected to the base so that the finger forms a loop.

2. The culinary mixer of claim 1, wherein the mixer is connected to the bottom surface of the lid.

3. The culinary mixer of claim 1, wherein base of the mixer is sized to rest on the open top of the container.

4. The culinary mixer of claim 1, wherein when the mixer is positioned within the container, a distance between the closed bottom of the container and the mixing fingers is less than or equal to about 3 cm.

5. The culinary mixer of claim 1, wherein the at least one mixing finger extends from the base of the mixer a distance greater than or equal to about 75% of the height.

6. The culinary mixer of claim 1, wherein at least one finger has an oval cross-section.

7. The culinary mixer of claim 1, wherein at least one finger has a ribbon shaped cross-section.

8. The culinary mixer of claim 1, wherein each of the at least one fingers are independently made of one or more of metal, plastic, rubber or rubber-coated metal.

9. The culinary mixer of claim 1, wherein the mixer has in the range of about 6 to about 30 fingers.

10. The culinary mixer of claim 1, wherein the inner side of the container comprises a plurality of ridges extending into the volume a distance in the range of about 1 mm to about 5 mm, the plurality of ridges spaced apart at different heights within the container.

11. The culinary mixer of claim 1 wherein the outside surface of the container includes a gripping region sized and shaped to fit a human hand.

12. The culinary mixer of claim 11, wherein the gripping region comprises a rubber gripping surface.

13. The culinary mixer of claim 1, wherein the sides of the lid include screw threads that cooperatively interact with complementary screw threads on the outside surface of the container.

14. The culinary mixer of claim 13, wherein the bottom surface of the lid has a recessed region sized to allow the open top of the container to fit within, the recessed region including an o-ring.

15. The culinary mixer of claim 1, wherein bottom surface of the lid has a plurality of tapered tabs that cooperatively interact with complementary projections on the container.

16. The culinary mixer of claim 15, wherein the bottom surface of the lid has a recessed region sized to allow the open top of the container to fit within, the recessed region including an o-ring.

17. A culinary mixer comprising:
a container having a closed bottom, inner side, an outside surface and an open top, the open top and closed bottom defining a container height;
a lid having a top surface, sides and a bottom surface, the lid configured to be connected to the open top of the container to form a fluid-tight seal and enclose a volume defined by the bottom surface of the lid, the inner sides and closed bottom of the container; and
a mixer having a base configured to be positioned adjacent the bottom surface of the lid and sized to fit within the volume, the mixer comprising a plurality of mixing fingers having a first end and a second end, the first end connected to the base and at least some of the fingers having a second end not connected to the base, the plurality of mixing fingers are configured so that no finger contacts another finger forming an intersection.

18. The culinary mixer of claim 17, wherein the inner side of the container comprises a plurality of ridges extending into the volume a distance in the range of about 1 mm to about 5 mm, the plurality of ridges spaced at different heights within the container.

19. The culinary mixer of claim 17, wherein the sides of the lid include screw threads that cooperatively interact with complimentary screw threads on the outside surface of the container.

20. A method of mixing comprising:
placing ingredients to be mixed within a container having a closed bottom, sides and an open top, the open top and closed bottom defining a container height;
positioning a mixer within the container, the mixer comprising a base with a plurality of mixing fingers extending there from, each of the fingers has a first end and a second end, the first end of each of the fingers connected to the base and at least some of the second ends are connected to the base so that the fingers form a loop, the mixing fingers extending greater than or equal to about 50% of the height of the container;
connecting a lid to the open top of the container to form a sealed container; and
shaking the sealed container a number of times to mix the ingredients.

* * * * *